United States Patent [19]
McInerney et al.

[11] 3,921,403
[45] Nov. 25, 1975

[54] AUXILIARY AIR SUPPLY SYSTEM AND METHOD FOR TURBOCHARGED ENGINES

[75] Inventors: Charles E. McInerney, Torrance; Robert L. Cholvin; Hans Egli, both of Santa Monica, all of Calif.

[73] Assignee: The Garrett Corporation, Los Angeles, Calif.

[22] Filed: Apr. 30, 1974

[21] Appl. No.: 465,646

[52] U.S. Cl. .............................. 60/606; 123/119 C
[51] Int. Cl.² ......................................... F02B 33/44
[58] Field of Search ............ 60/597, 598, 599, 600, 60/601, 602, 603, 605, 606, 607, 608, 609, 612, 614; 123/119 C, 119 CD, 119 CE, 119 CF

[56] References Cited
UNITED STATES PATENTS

| | | | |
|---|---|---|---|
| 2,109,237 | 2/1938 | Lustig | 60/607 X |
| 2,283,644 | 5/1942 | Nallinger | 123/119 CE |
| 2,968,914 | 1/1961 | Birmann | 60/608 |
| 3,020,901 | 2/1962 | Cook | 123/119 C |
| 3,096,615 | 7/1963 | Zuhn | 60/606 |
| 3,143,849 | 8/1964 | Glamann | 60/609 |
| 3,190,068 | 6/1965 | Williams et al. | 60/607 |
| 3,389,554 | 6/1968 | Wolf | 60/608 |
| 3,595,013 | 7/1971 | Brille et al. | 60/599 |
| 3,797,562 | 3/1974 | Brille et al. | 123/119 C X |

Primary Examiner—Charles J. Myhre
Assistant Examiner—James D. Liles
Attorney, Agent, or Firm—Alfons Valukonis; Albert J. Miller

[57] ABSTRACT

Method and apparatus for providing auxiliary air to an internal combustion engine receiving compressed charge air from an exhaust gas driven compressor in accordance with the charge air requirements of the engine.

24 Claims, 4 Drawing Figures

AUXILIARY AIR SUPPLY SYSTEM AND METHOD FOR TURBOCHARGED ENGINES

BACKGROUND OF THE INVENTION

Present turbocharged engines have disadvantages in that bursts of exhaust smoke are emitted at the beginning of rapid engine acceleration. This occurs because the exhaust driven turbocharger is essentially at rest at the beginning of each acceleration period. When the engine throttle is rapidly opened, fuel is immediately injected into the engine, but for a short period of time the compressor of the turbocharger is incapable of supplying enough air to the engine for the amount of fuel being supplied to the engine. Attempts to minimize this exhaust smoke during acceleration periods generally have proved unsuccessful because of failure to properly maintain engine air charge flow to the engines. Although turbocharged engines emit puffs of smoke during rapid acceleration, during constant speed operation the exhaust smoke emitted by turbocharged engines is usually less than that emitted by naturally aspirated engines.

Examples of prior art internal combustion engines are U.S. Pat. No. 2,020,224 to Waseige; U.S. Pat. No. 1,860,449 to Buchi; U.S. Pat. No. 2,645,409 to Lawler; U.S. Pat. No. 2,918,787 to Schelp; U.S. Pat. No. 3,595,013 to Brille; U.S. Pat. No. 3,611,711 to Mueller; U.S. Pat. No. 3,473,332 to Wolf; and U.S. Pat. No. 3,190,068 to Williams et al.

SUMMARY OF THE INVENTION

A main object of the present invention is to provide method and apparatus capable of supplying turbocharged engines with needed additional air during engine acceleration periods, and other periods when the turbocharger alone cannot provide sufficient charge air to the engine.

Accordingly, there is provided method and apparatus providing auxiliary air to an internal combination engine receiving compressed charge air from an exhaust gas driven compressor wherein fluid is pumped by the engine, the auxiliary air is compressed by an auxiliary air compressor driven by the pumped fluid, and the flow of the auxiliary air to the exhaust gas driven compressor is controlled in response to the charge air requirements of the internal combustion engine. In accordance with one aspect of the invention, flow control of the auxiliary air is provided by directing the auxiliary air or air from an air source to the exhaust gas driven compressor. According to another aspect, the flow control of auxiliary air is achieved by regulating flow of the auxiliary air to the exhaust gas driven compressor in response to charge air pressure. In another aspect, the flow of auxiliary air to the exhaust gas driven compressor is regulated in response to charge and auxiliary air pressures. One other aspect provides for cooling the charge air with cooling apparatus driven by the pumped fluid when the charge air requirements of the internal combustion engine have been satisfied.

DETAILED DESCRIPTION OF THE PREFERRED EMBODIMENTS

Figure 1:
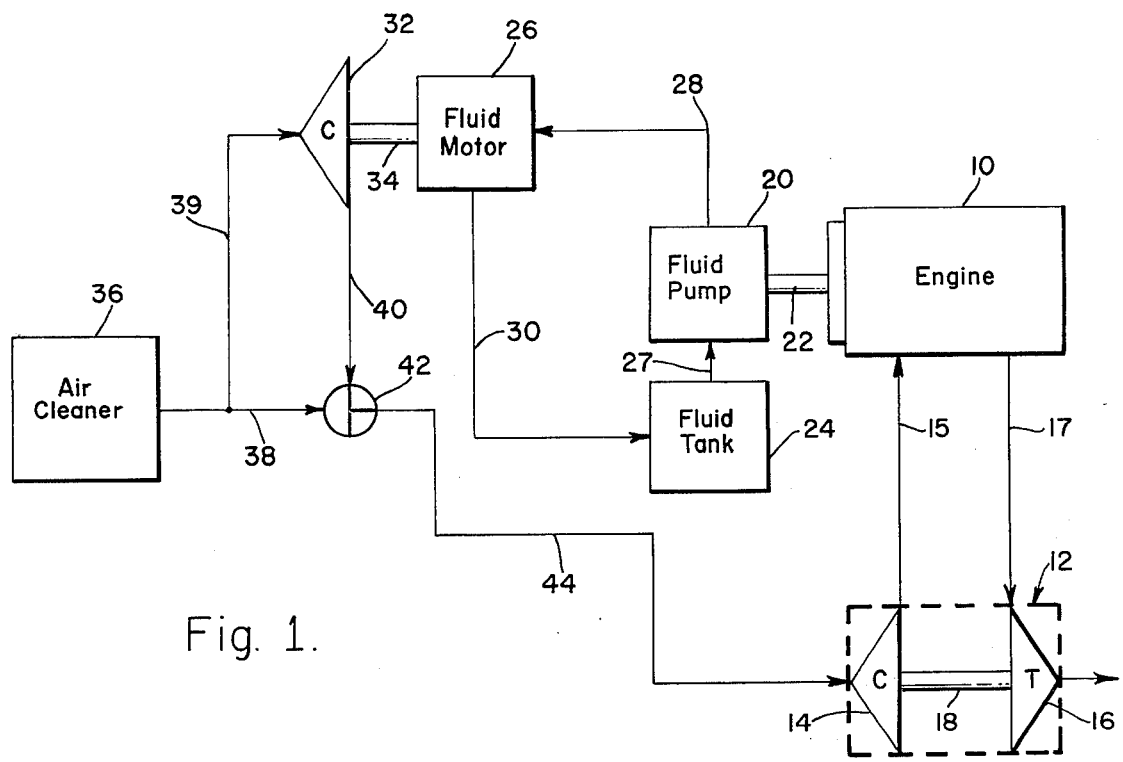
FIG. 1 is a schematic block diagram showing of one embodiment of the air supply apparatus of the present invention utilized with a turbocharged engine.

Reference is now made to FIG. 1 wherein there is shown one embodiment of the air supply system of the present invention capable of supplying auxiliary air to an internal combustion engine 10. Engine 10 has a turbocharger 12 consisting of a compressor 14 driven by a turbine 16 through shaft 18. Compressor 14 supplies compressed charge air through line 15 to an engine inlet manifold (not shown), and turbine 16 is driven by exhaust gases passing through a line 17 from an exhaust manifold (not shown). Engine 10 may be of the spark-ignition or diesel type. A fluid pump 20 is driven by engine 10 through shaft 22, and is arranged to supply liquid fluid, such as oil, from a tank 24 to a fluid motor 26 through lines 27 and 28, and return to tank 24 through line 30. Motor 26, which could be an axial flow impulse type turbine, is directly coupled to an auxiliary air compressor 32 by shaft 34. Compressor 32 can be of the centrifugal type which compresses air supplied from a source, which could be the ambient atmosphere, through an air cleaner 36, and lines 38 and 39. The compressed auxiliary air from compressor 32 is directed through a line 40. A valve 42 interconnects line 38, 40, and a line 44 leading to compressor 14 of the exhaust driven turbocharger 12. Valve 42 is illustrated as being selectively, manually positionable, but could be a check valve. Valve 42 can be positioned to connect line 40 with line 44 to supply compressor 14 with air solely from compressor 32. Valve 42 can also be positioned to connect lines 38 and 44 to supply air to compressor 14 solely from the ambient atmosphere through air cleaner 36.

In operation, when additional air is needed, such as when engine 10 is accelerating, valve 42 is positioned to connect lines 40 and 44, thus supplying compressor 14 with air solely from compressor 32 in sufficient quantity to increase the output pressure of compressor 14 to completely burn the fuel and eliminate engine exhaust smoke. When turbocharger compressor 14 alone can supply sufficient air to engine 10, such as when engine 10 attains constant speed, valve 42 is positioned to connect lines 38 and 44 which provides air to compressor 14 solely from the ambient atmosphere through air cleaner 36.

Figure 2:
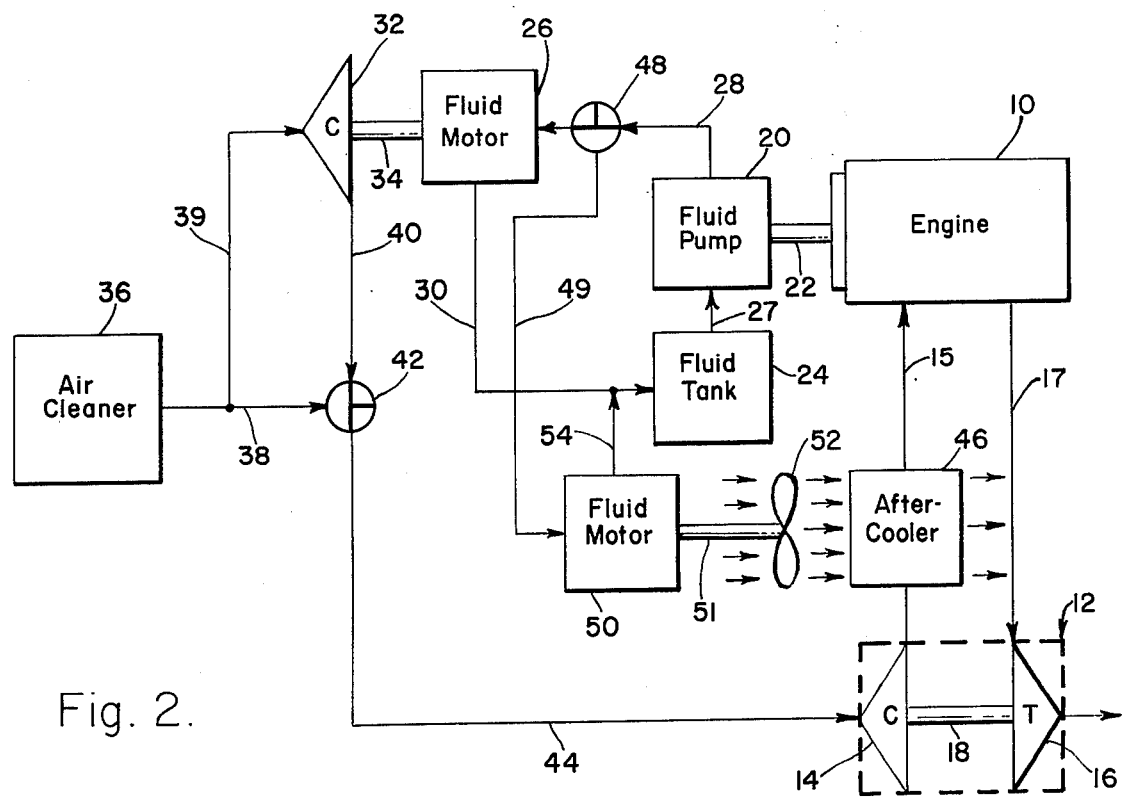
FIG. 2 is a schematic block diagram showing of another embodiment of the air supply apparatus of the present invention.

The embodiment of FIG. 2 utilizes components similar to those used in the embodiment of FIG. 1, and like numerals serve to designate like components. In the embodiment of FIG. 2 an air to air aftercooler 46 is arranged to cool the charge air from turbocharger compressor 14 prior to its entry into engine 10. A valve 48 is provided in line 28. Valve 48 can be manually positioned to direct fluid from the pump 20 to fluid motor 26. Valve 48 can also be positioned to direct fluid through a line 49 to a fluid motor 50, which is connected by shaft 51 to an aftercooler fan 52. A line 54 returns the fluid from motor 50 to tank 24.

In operation, when additional air is needed, such as when the engine 10 is accelerating, valve 48 is positioned to conduct fluid from pump 20 to motor 26 which drives compressor 32. Compressor 32 compresses air and directs it along line 40. As in the embodiment of FIG. 1, valve 42 can be positioned in one or the other of two positions, depending on the amount of air needed for complete fuel combustion. In one position valve 42 connects lines 40 and 44, which supplies air solely from compressor 32 to compressor 14 during engine acceleration, or other period of need for additional air. However, when additional air is not required from compressor 32 for complete fuel combustion, valve 42 is positioned in the other position to connect lines 38 and 44, which provides air only from air cleaner 36 to compressor 14. Under these conditions fluid utilized to actuate motor 26, which drives compressor 32, is instead diverted to motor 50 by positioning valve 48 to connect lines 28 and 49. Motor 50 now turns fan 52, which passes cooling air about aftercooler 46, thus increasing the density of air supplied to engine 10 through line 15 and aftercooler 46, serving to increase engine power output.

Figure 3:
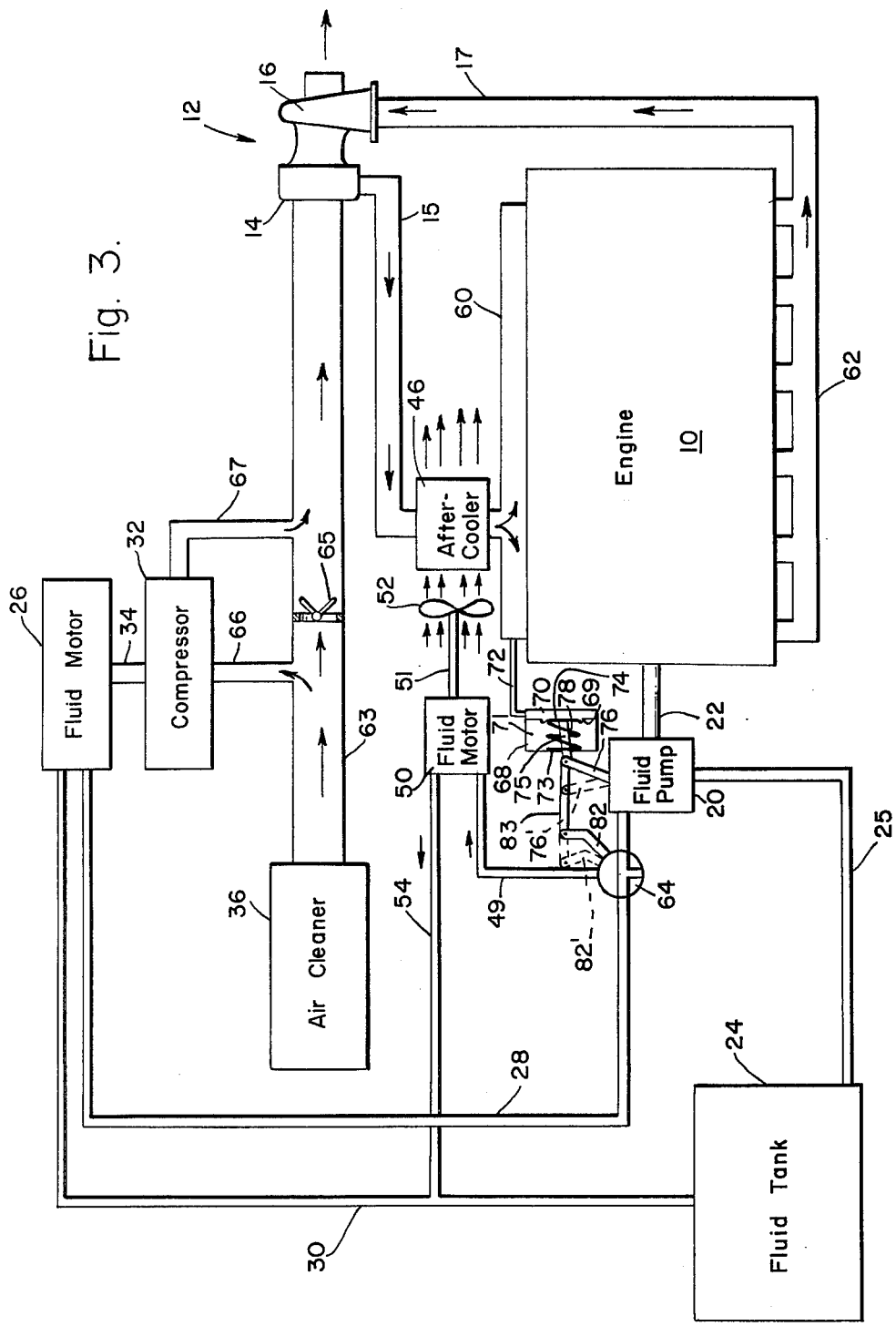
FIG. 3 is a schematic block diagram showing of yet another embodiment of the present invention.

Reference is now made to FIG. 3 wherein there is revealed another embodiment of the invention which provides pneumatic control for the auxiliary air supply apparatus to minimize exhaust smoke during engine operation. The embodiment of FIG. 3 utilizes parts similar to those used in the embodiments of FIGS. 1 and 2, and like numerals serve to designate like parts. Engine 10 is now shown as being provided with an air inlet manifold 60 and an exhaust discharge manifold 62. Turbine 16 of the turbocharger 12 is driven by exhaust gases from engine 10 delivered through line 17 which is connected from exhaust manifold 62 to the turbine. Compressed air from compressor 14 is delivered through line 15 and aftercooler 46 to intake manifold 60. Air cleaner 36 supplies ambient air through line 63 and check valve 65 to compressor 14. A variable displacement pump 20 having a fluid output control lever 76, is driven by engine 10 through shaft 22, and supplies liquid fluid from tank 24, through a flow diverting valve 64, to fluid motor 26 which drives the auxiliary compressor 32. Compressor 32 receives air to be compressed from lines 63 and 66, and discharges the compressed air through line 67 beyond check valve 65.

In order to sense charge air pressure level in inlet manifold 60, there is provided a spring-loaded diaphragm actuator 68. Actuator 68 regulates a pump 20 by moving lever 76 in response to the sensed pressure in manifold 60, and accordingly, the compressed air output of compressor 32. Actuator 68 senses the pressure in intake manifold 60 directly on a diaphragm 69 which is mounted in the actuator to form chambers 70 and 71. Chamber 70 is connected to manifold 60 by means of tube 72, and chamber 71 is connected to the atmosphere as by opening 73. Diaphragm 69 has a central stiffening plate 74 that is rigidly connected to one end of a rod 75 which has its other end pivotally connected to lever 76 on pump 20. This arrangement serves to decrease the output of pump 20 when actuator rod 75 is moved to the left due to the pressure in engine manifold 60 exceeding the amount required to overcome the force of a spring 78 positioned within actuator 68 urging diaphragm 69 in the opposite direction. The desired value of the pressure in manifold 60 at which actuator rod 75 begins to move is determined by the selected predetermined spring force of spring 78.

Valve 64 has a control lever 82 which is pivotally connected to one end of rod link 83. Link 83 has its other end pivotally connected to lever 76 so as to provide movement of lever 82 to the position 82', thus setting valve 64 in a position to divert the fluid output of pump 20 from motor 26 through line 49 to motor 50 when output control lever 76 of pump 20 is at its low output position 76'. In other words, when pump 20 is delivering maximum fluid output, and valve 64 is positioned to divert the fluid output to motor 26, levers 76 and 82 are positioned as shown in FIG. 3. However, when pump 20 is delivering its lowest fluid output, valve 64 is set to divert fluid to motor 50, and the levers 76 and 82 occupy positions 76' and 82', respectively.

The embodiment of FIG. 3 operates as follows:

With engine 10 started, the spring-loaded actuator 68 senses charge air pressure generated in intake manifold 60 through line 72, in chamber 70, and directly on one side of diaphragm 69. As long as the pressure in chamber 70 is incapable of providing a force on diaphragm 69 which is sufficiently large to overcome the spring force of spring 78 on the other side of diaphragm 69, it will not move. In this position of diaphragm 69 control lever 76 is set to provide the maximum fluid output of pump 20, and valve control lever 82 is set to position valve 64 so that the full force of the maximum fluid output of pump 20 is applied through line 28 to motor 26. Motor 26 drives compressor 32 through shaft 34, and compressor 32 compresses air drawn in from lines 63 and 66, and provides the maximum attainable amount of compressed additional air through the line 67 to engine compressor 14. This high output condition of compressor 32 will continue as long as the charge air pressure in manifold 60 remains below that amount necessary to move diaphragm 69 against the restraint of spring 78, and engine 10 will be supplied with sufficient air to achieve substantially complete fuel combustion and eliminate exhaust smoke during engine acceleration.

When the generated charge air pressure in manifold 60 and chamber 70 increases to the point where the force on diaphragm 69 due to this pressure exceeds the initial spring force of spring 78, diaphragm 69 moves to the left. Actuator rod 75 and control lever 76 both also move in the same direction to reduce the fluid output of pump 20. The reduced fluid output of pump 20 results in reduced power output by motor 26, and less air is compressed by compressor 32 for delivery to engine compressor 14. Continued increase of the pressure in manifold 60 results in less and less air compressed by compressor 32 until lever 76 becomes positioned in the 76' position, thus providing the lowest output of pump 20. Simultaneously, valve control lever 82 becomes positioned in the 82' position which diverts the output of pump 20 through line 49 to motor 50. Motor 50 turns fan 52 which passes cooling air about aftercooler 46, thus increasing the density of air supplied to engine 10 through line 15, as in the embodiment of FIG. 2.

If the charge air pressure occurring in manifold 60 tends to decrease, while still above the initial pressure necessary to overcome the force of spring 78, pump control lever 76 will move towards the right to increase the output of pump 20. This movement of lever 76 increases the fluid power available to motor 26, which increases the output of compressor 32.

Figure 4:
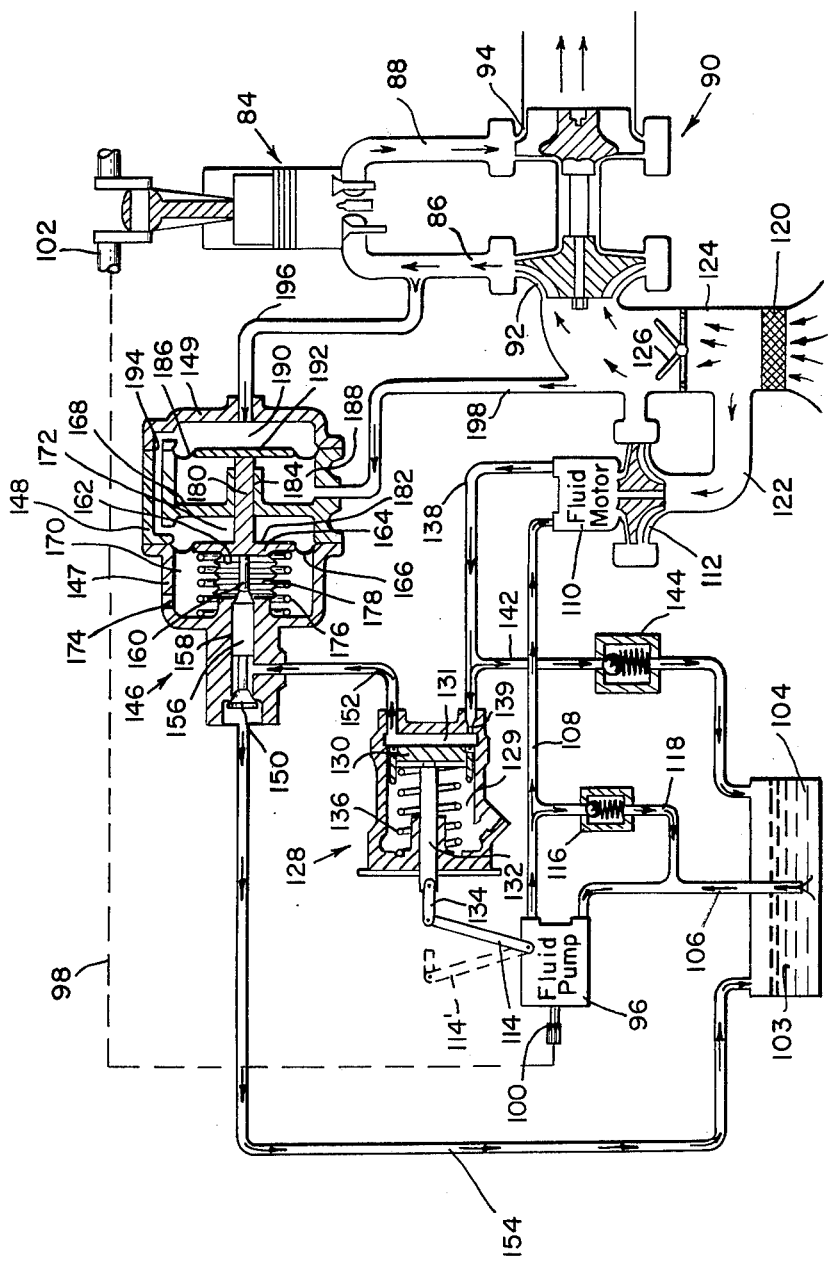
FIG. 4 is a schematic, partly in section, showing of one other embodiment of the invention.

In the embodiment of FIG. 4, engine 84 illustrated as being of the diesel type of internal combustion engine which has an intake manifold 86 and an exhaust manifold 88. A turbocharger 90 is provided with a compressor 92 connected to intake manifold 86, and a turbine 94 driven by the exhaust output from manifold 88 for driving compressor 92. A variable displacement pump 96 is driven by engine 84 through a suitable drive coupling 98 secured to a pump shaft 100 and engine shaft 102. Pump 96 supplies liquid fluid 103 from a reservoir 104 through lines 106 and 108 to a fluid motor 110 which is coupled to drive an auxiliary compressor 112. Pump 96 has an output control lever 114. A pressure relief valve 116 is provided in line 118 connecting lines 106 and 108 for relieving output pressure of pump 96 in the event of failure or malfunction of motor 110 or compressor 112. As in the previous embodiments motor 110 can be an axial flow impulse type turbine and compressor 112 can be of the centrifugal type whereby ambient atmospheric air is passed through a filter 120, line 122, compressed in the compressor 112 and discharged into the input line 124 beyond a check valve 126 to engine compressor 92.

A fluid actuator 128 is provided which has a sliding piston 130 positioned therein, forming chambers 129 and 131, and carrying a rod 132 having its end pivotally connected to pump control level 114 by a short link 134. Actuator 128 is spring loaded by an actuator spring 136 positioned in chamber 129 to urge piston 130 in a direction to position control lever 114 at the low pump output position, as illustrated. The high pump output position is at 114'. A line 138, having a restriction 139, connects fluid motor 110 with chamber 131 within the actuator behind piston 130. A line 142 and a pressure regulator 144 interconnect line 138 with reservoir 104. Pressure regulator 144 serves to maintain the fluid pressure upstream of restriction 139 constant.

A differential pressure controller 146 is provided with a housing having portions 147, 148 and 149. Housing portion 147 has a servo valve 150 arranged to control flow of fluid from chamber 131 of actuator 128 through lines 152 and 154 to reservoir 104. Valve 150 has a stem 156 slidably supported in a guide 158 within housing portion 147. Stem 156 is provided with a reduced diameter portion 160 which has its end secured to a face 162 of a central stiffening plate 164 of a diaphragm 166. Diaphragm 166 is positioned within the housing intermediate the portions 147 and 148 to form chambers 170 and 172 with a partition 168, positioned in housing portion 148. The chamber 170 is opened to the surrounding atmosphere as by the opening 174. A calibrator spring 176 within chamber 170 is positioned to urge plate 164 in a direction to maintain valve 150 closed to prevent flow of fluid from line 152 to line 154. A bellows 178, within spring 176, and surrounding reduced diameter stem portion 160, is attached at its ends to housing portion 174 and plate 164. A member 180 is integrally carried by the other face 182 of plate 164, and is slidingly engaged in a guide 184 provided for in partition 168. Another diaphragm 186 is positioned within the housing intermediate the portions 148 and 149 to form two chambers 188 and 190, and carries a central stiffening plate 192 which is adapted to engage member 180. A passageway 194 in housing portions 148 and 149 connects chambers 172 and 190. A line 196 connects manifold 86 with chamber 190, and a line 198 connects line 124 with the chamber 188.

In operation, while engine 84 is being started, actuator spring 136 urges piston 130 in a direction to hold pump control lever 114 in the low pump output position, which minimizes the load on the engine starter motor (not shown) due to pump 96 and shaft connection 98.

After engine 84 is started, sufficient fluid 103 will be pumped by pump 96 from reservoir 104 through lines 106 and 108 to hydraulic motor 110 to drive compressor 112. Fluid 103 returns to reservoir 104 through lines 138 and 142 and back pressure regulator 144. Fluid also enters chamber 131 of actuator 128 through line 138 and restriction 139 to provide enough pressure in the chamber to move piston 130 and lever 114 from its low towards its high pump output position 114' to produce high fluid output of pump 96 and high pressure auxiliary air from compressor 112. Increase in the pressure of charge air from compressor 92 will be sensed by controller 146 in chamber 172 which moves diaphragm 166 to open servo valve 150 when the force developed on the diaphragm reaches the valve for which the controller 146 has been calibrated and is sufficient to overcome the bias force of spring 176. Opening of the servo valve 150 causes the fluid in chamber 131 of actuator 128 to vent to line 154 and flow back to reservoir 104, thus reducing pressure in chamber 131. Pump output control lever 114 moves towards the illustrated low position, causing reductions in the fluid output from pump 96, auxiliary air from compressor 112 and accordingly, charge air from compressor 92.

The second diaphragm 186, which senses the differential pressure across compressor 92 in the controller 146, provides the desirable feature of reducing the charge air pressure developed by compressor 92 as engine speed is increased at no load. Diaphragm 186 senses the differential pressure between the pressure in chamber 190, which is the charge air pressure in manifold 86 developed by compressor 92, and the pressure in chamber 188, which is the auxiliary air pressure developed by compressor 112. With no load on engine 84 the charge air pressure developed by compressor 92 is low at low engine speed but increases as engine speed increases. Diaphragm 186 senses this differential pressure increase, and moves in cooperation with diaphragm 166 to open servo valve 150 to vent fluid from chamber 131 through line 152 to line 154 and reservoir 104. Pump control lever 114 moves towards the low position, as illustrated, resulting in a reduction of the outputs of motor 110, auxiliary air from compressor 112, and, accordingly, charge air from compressor 92.

While specific embodiments of the invention have been illustrated and described, it is to be understood that they are provided by way of example only and that the invention is not to be construed as being limited thereto, but only by the proper scope of the following claims.

What we claim is:

1. In combination with an internal combustion engine which receives compressed charge air from an exhaust gas-driven compressor, means for providing auxiliary air to said engine, said means comprising:
   fluid pumping means driven by the internal combustion engine;
   auxiliary air compressor means driven by fluid from said fluid pumping means; and
   means for controlling the flow of auxiliary air from said auxiliary air compressor means to the exhaust gas-driven compressor in response to the charge air requirements of the internal combustion engine.

2. The combination of claim 1 wherein said auxiliary air flow control means comprises:
   valve means positionable to regulate flow of auxiliary air from said auxiliary air compressor means or air from a source of air to the exhaust gas driven compressor.

3. The combination of claim 1 wherein said auxiliary air flow control means comprises:
   means for controlling fluid flow from said fluid pumping means to said auxiliary air compressor means in response to the pressure variations of the compressed charge air.

4. The combination of claim 3 wherein said fluid flow control means comprises:
   variable output control means operably connected to regulate fluid output from said fluid pumping means; and
   fluid pressure responsive actuator means operably connected to vary said fluid output control means in response to the pressure variations of the compressed charge air.

5. The combination of claim 1 wherein said auxiliary air flow control means comprises:
   means for controlling fluid flow from said fluid pumping means to said auxiliary air compressor means in response to the pressure variations of the compressed charge air and auxiliary air.

6. The combination of claim 5 wherein said fluid flow control means comprises:
   variable fluid output control means operably connected to regulate fluid output from said fluid pumping means;
   fluid pressure responsive actuator means operably connected to vary said fluid output control means in response to the pressure variations of the fluid;
   valve means operably connected to relieve fluid pressure in said fluid pressure responsive actuator when actuated; and
   differential pressure controller means operably connected to actuate said valve means in response to the pressure variations of the compressed charge air and auxiliary air.

7. The combination of claim 1 further comprising:
   air charge cooling means driven by fluid from said fluid pumping means.

8. The combination of claim 7 wherein said air charge cooling means comprises:
   an air-to-air aftercooler connected to conduct the charge air to the engine;
   a fan positioned to pass cooling air through said aftercooler when driven to cool the charge air;
   a fluid motor connected to drive said fan; and
   valve means connected for controlling flow of fluid to said auxiliary air compressor means or said fluid motor.

9. The combination of claim 8 wherein said valve means is a manually positionable valve.

10. The combination of claim 8 wherein said valve means is positionable in response to pressure variations of the compressed air charge.

11. In combination with an internal combustion engine which receives compressed charge air from an exhaust gas-driven compressor, means for providing auxiliary air to said engine, said means comprising:
    an auxiliary compressor for compressing the auxiliary air;
    a fluid motor connected to drive said auxiliary compressor;
    a fluid tank having fluid;
    a fluid pump connected in a closed fluid circuit to the tank and the fluid motor and driven by the engine for pumping fluid from said tank to drive said fluid motor; and
    a valve means connected to control flow of air from an air source or the compressed auxiliary air from said auxiliary compressor to the exhaust gas-driven compressor.

12. The combination of claim 11 further comprising:
    an air-to-air aftercooler connected to conduct the charge air to the engine;
    a fan positioned to pass cooling air through said aftercooler when driven to cool the charge air;
    a fluid motor connected to drive said fan; and
    a valve means connected to control flow of fluid to said auxiliary compressor driving fluid motor or said fan driving fluid motor.

13. In combination with an internal combustion engine which receives compressed charge air from an exhaust gas-driven compressor, means for providing auxiliary air to said engine, said means comprising:
    an auxiliary compressor for compressing the auxiliary air;
    a first fluid motor connected to drive said auxiliary compressor;
    a fluid tank having fluid;
    a fluid pump connected in a closed fluid circuit to the tank and the fluid motor and driven by the engine for pumping fluid from said tank to drive said first fluid motor;
    a controller operably connected to regulate fluid output from said fluid pump when actuated;
    fluid pressure responsive actuator means operably connected to actuate said controller in response to the pressure variations of the charge air;
    an air-to-air aftercooler connected to conduct charge air to the engine;
    a fan positioned to pass cooling air through said aftercooler when driven to cool the charge air;
    a second fluid motor connected to drive said fan; and
    a valve means connected for controlling flow of fluid to said first or second fluid motors, said valve means being connected for positioning by said controller to divert fluid to said first fluid motor when the fluid output of said pump is highest and said second fluid motor when the fluid output of said pump is lowest.

14. The combination of claim 13 wherein said actuator means comprises:
    a housing;
    a flexible diaphragm positioned within said housing to define a pair of chambers, said diaphragm being operably connected to said controller for simultaneous movement, one of the chambers being connected to the engine to sense charge air pressure, the other chamber being open to atmosphere; and
    a spring in the other chamber positioned to urge said diaphragm in a direction to position said controller to provide maximum pump fluid output.

15. In combination with an internal combustion engine which receives compressed charge air from an exhaust gas-driven compressor, means for providing auxiliary air to said engine, said means comprising:
    an auxiliary compressor for compressing the auxiliary air to the exhaust gas-driven compressor;
    a fluid motor connected to drive said auxiliary compressor;
    a fluid tank having fluid;
    a fluid pump connected in a closed fluid circuit to the tank and the fluid motor and driven by the engine for pumping fluid from said tank to drive said fluid motor;

an output controller operably connected to regulate fluid output from said fluid pump when actuated;

a fluid pressure responsive actuator connected to receive fluid from said fluid motor and connected to actuate said output controller in response to the fluid pressure variations;

a valve means connected to allow flow of fluid from said actuator to said tank when opened and to retain fluid in said actuator when closed; and a differential pressure controller operably connected to open and close said valve means in response to the pressure variations of the compressed charge air and auxiliary air.

16. The combination of claim 15 wherein said fluid pressure responsive actuator comprises:

a housing having a sliding piston therein defining first and second chambers, said piston being connected to said output controller for simultaneous movement, the first chamber being connected to said valve and to receive fluid from said fluid motor;

a spring in said second chamber positioned to urge said piston in a direction to position said output controller to provide minimum pump fluid output.

17. The combination of claim 15 wherein said differential pressure controller comprises:

a housing;

a first flexible diaphragm and a partition position within said housing to define a first and second chamber, said first chamber being open to the atmosphere;

a second flexible diaphragm positioned within said housing and defining third and fourth chambers with said partition, said third and fourth chambers being operatively connected to sense the auxiliary and charger air pressures, respectively;

passageway means in said partition interconnecting said second and fourth chambers;

means operatively associating said diaphragms and valve for simultaneous movement; and a spring within said first chamber positioned to urge said first flexible diaphragm in a direction to close said valve.

18. The method of providing auxiliary air to an internal combustion engine receiving compressed charge air from an exhaust gas-driven compressor comprising the steps of:

pumping fluid with the engine;

driving a compressor with the fluid pumped by the enging to compress auxiliary air; and controlling the flow of the auxiliary air to the exhaust gas-driven compressor in response to the charge air requirements of the internal combustion engine.

19. The method of claim 18 wherein the step of controlling flow of auxiliary air to the exhaust gas-driven compressor includes selecting between the compressed auxiliary air or air from an air source.

20. The method of claim 18 wherein the step of controlling flow of auxiliary air to the exhaust gas-driven compressor includes regulating flow of the compressed auxiliary air in response to charge air pressure.

21. The method of claim 18 wherein the step of controlling flow of auxiliary air to the exhaust gas-driven compressor includes regulating flow of the compressed auxiliary air in response to charge and auxiliary air pressures.

22. The method of claim 18 further comprising the step of:

cooling the charge air with air moving means driven by the fluid pumped with the engine when the charge air requirements of the internal combustion engine have been satisfied.

23. Apparatus for providing auxiliary air to a turbocharged internal combustion engine comprising:

fluid pumping means adapted to be driven by the internal combustion engine;

auxiliary air compressor means adapted to be driven by fluid pumped from said fluid pumping means and deliver auxiliary compressed air to the turbocharged engine; and means for controlling the flow of auxiliary compressed air from said auxiliary air compressor to the turbocharged engine in response to the charge air requirements of the turbocharged engine.

24. Apparatus for providing auxiliary air to an exhaust gas-driven compressor for an internal combustion engine comprising:

a fluid tank to hold a supply of fluid;

a fluid pump, adapted to be driven by the internal combustion engine, operably connected to said fluid tank to pump fluid therefrom;

a fluid motor operably connected in a closed fluid circuit to said fluid tank and said fluid pump to be driven by the pumped fluid;

an auxiliary compressor, adapted to be driven by said fluid motor, for compressing auxiliary air; and valve means operably associated with said auxiliary compressor and adapted to select between the flow of auxiliary compressed air and ambient atmospheric air to the exhaust gas-driven compressor in response to charge air requirements of the internal combustion engine.

* * * * *